(12) United States Patent
Fabian Mariezkurrena et al.

(10) Patent No.: US 8,617,330 B2
(45) Date of Patent: Dec. 31, 2013

(54) PROCESS AND INSTALLATION FOR THE PRODUCTION OF STIFF RECYCLABLE SANDWICH-TYPE POLYMERIC PANELS, WITHOUT THE USE OF ADHESIVES, AND THE PANEL PRODUCED

(75) Inventors: Aitor Fabian Mariezkurrena, Onate (ES); Marcelo de Sousa Pais Antunes, Terrassa (ES); Jose Ignacio Velasco Perero, Terrassa (ES)

(73) Assignee: ULMA CyE, S. Coop., Onate (Guipuzcoa) (ES)

( * ) Notice: Subject to any disclaimer, the term of this patent is extended or adjusted under 35 U.S.C. 154(b) by 696 days.

(21) Appl. No.: 12/670,996

(22) PCT Filed: Jul. 24, 2008

(86) PCT No.: PCT/ES2008/000516
§ 371 (c)(1),
(2), (4) Date: Apr. 28, 2010

(87) PCT Pub. No.: WO2009/027548
PCT Pub. Date: Mar. 5, 2009

(65) Prior Publication Data
US 2010/0215935 A1      Aug. 26, 2010

(30) Foreign Application Priority Data

Jul. 27, 2007  (WO) ................. PCT/ES2007/000464

(51) Int. Cl.
*B29C 44/20* (2006.01)
*B29C 44/56* (2006.01)
*B29C 47/14* (2006.01)

(52) U.S. Cl.
USPC ............. 156/78; 264/45.3; 264/46.1; 264/50; 425/376.1; 425/380; 425/461

(58) Field of Classification Search
USPC ............. 156/77, 78; 264/45.3, 45.9, 46.1, 50, 264/176.1, 177.16; 428/315.9, 317.9, 428/318.6, 319.9; 425/376.1, 380, 461
See application file for complete search history.

(56) References Cited

U.S. PATENT DOCUMENTS

| 2,734,224 A | 2/1956 | Winstead |
| 3,305,991 A | 2/1967 | Weismann |

(Continued)

FOREIGN PATENT DOCUMENTS

| DE | 2041892 A1 | 3/1971 |
| DE | 196 11 382 A1 | 9/1997 |

(Continued)

OTHER PUBLICATIONS

Abstract and Machine translation of FR 2844538 A1. Date Unknown.*

*Primary Examiner* — Michael Tolin
(74) *Attorney, Agent, or Firm* — Sughrue Mion, PLLC

(57) ABSTRACT

The present invention describe a process and an installation for the production of stiff recyclable sandwich-type polymeric panels, preferably polypropylene-based panels, and the panel obtained, comprising three lines, in one of which a polymeric polypropylene-based foamed core is produced by extrusion (line A); the structural skins are produced in a second line (line B), which skins are formed by a polypropylene-based lamina reinforced with wood fiber, on which lamina there is applied an also polypropylene-based surface coating layer reinforced with glass fibers; in the third line the structural skins produced in line B are adhered by heat and pressure to the foamed core produced in line A. The sandwich panel produced has a thickness between 7 and 40 mm, an overall density of 400-700 kg/m$^3$ and an elastic modulus of 5-10 GPa.

9 Claims, 7 Drawing Sheets

(56) References Cited

U.S. PATENT DOCUMENTS

| | | | | |
|---|---|---|---|---|
| 3,555,131 | A | 1/1971 | Weismann | |
| 3,838,241 | A | 9/1974 | Weismann | |
| 3,927,160 | A * | 12/1975 | Medley | 264/45.5 |
| 4,120,330 | A | 10/1978 | Weismann | |
| 4,844,766 | A | 7/1989 | Held | |
| 5,180,751 | A | 1/1993 | Park et al. | |
| 5,707,573 | A * | 1/1998 | Biesenberger et al. | 264/50 |
| 5,783,129 | A * | 7/1998 | Shirai et al. | 264/136 |
| 5,876,534 | A | 3/1999 | Erhardt | |
| 5,928,735 | A * | 7/1999 | Padmanabhan et al. | 428/33 |
| 6,520,759 | B2 * | 2/2003 | Kitayama et al. | 425/4 C |
| 6,759,446 | B2 | 7/2004 | Lee et al. | |
| 6,767,623 | B1 * | 7/2004 | Mock et al. | 428/318.6 |
| 2007/0078191 | A1 | 4/2007 | Guhde et al. | |

FOREIGN PATENT DOCUMENTS

| | | |
|---|---|---|
| DE | 196 11 413 A1 | 9/1997 |
| EP | 1 426 525 A1 | 6/2004 |
| EP | 1 745 909 A2 | 1/2007 |
| ES | 1023819 U | 7/1993 |
| ES | 2 149 496 T3 | 1/2000 |
| FR | 2 844 538 A1 | 3/2004 |
| WO | 2004/111368 A1 | 12/2004 |

* cited by examiner

PROCESS AND INSTALLATION FOR THE PRODUCTION OF STIFF RECYCLABLE SANDWICH-TYPE POLYMERIC PANELS, WITHOUT THE USE OF ADHESIVES, AND THE PANEL PRODUCED

This application is a National Stage of International Application No. PCT/ES2008/000516 filed Jul. 24, 2008, claiming priority based on International Application No. PCT/ES2007/000464 filed Jul. 27, 2007, the contents of all of which are incorporated herein by reference in their entirety.

FIELD OF THE INVENTION

The present invention relates to an installation for the production and assembly without the use of adhesives of stiff recyclable sandwich-type panels for being applied in the construction sector, which panels are formed by a foamed stiff central core and structural skins, being polymeric in nature in both cases.

The installation is fed a new formulation of polymeric materials which, once mixed and melted, are foamed by extrusion, to form a stiff core (typical specific elastic modulus 1.5 GPa cm$^3$/g) with optimal mechanical features, moisture resistance and reduced density, comprised between 100 and 500 kg/m$^3$.

The structural skins are assembled on the core obtained by extrusion without using adhesives to form a stiff and recyclable sandwich panel for use in structural applications, particularly in the construction sector.

BACKGROUND OF THE INVENTION

The use of wood shuttering panels has always been very widespread in the construction sector, which panels provide multiple advantages, including that of providing good mechanical characteristics and nailability. However, wood shuttering panels have a short life due to the environment in which their activity is developed, since they are generally exposed to water, moisture, abrasive materials (cement, lime, concrete, etc.), which shortens their service life.

In addition, once deteriorated, they must necessarily be removed and the possibilities of repairing and recycling them are complicated and, in any case, limited.

The ecological impact involved in producing millions of square meters of shuttering panels from forest wood, as occurs with all products produced from an asset that is as scarce as wood, is not insignificant either.

For the purpose of the durability of the panel, shuttering panels combining wood and plastic materials have been developed for a long time. This type of panel is described in patents DE 19611413, DE 19611382 and EP 1 426 525. The wood panel is generally complemented with edges and borders of plastic materials, suitably assembled or fixed to the wood core, which prevent, to a certain extent, its deterioration in transport, falls and blows.

Likewise, processes for the production of panels formed only by polymeric materials, recycled rubber or combinations of various plastic materials have been researched and developed. This technology generally attempts to fulfill a dual objective, on one hand, dispose of the large amount of plastic waste generated by the automobile industry and search for a use for such waste through its recycling for the production of panels for construction.

A process for the production of panels from recycled materials is described in patent WO 2004/111368, which allows producing a composite board based on plastic and rubber from triturated tires. A core is obtained to which structural skins are added to complete the shuttering board. The board produced by this process is quite dense and difficult to recycle, in addition to not having good mechanical and nailability characteristics required of a shuttering panel.

Sandwich type isolated structural panels have been used for a long time, as described in U.S. Pat. No. 3,305,991, U.S. Pat. No. 3,555,131, U.S. Pat. No. 3,838,241 and U.S. Pat. No. 4,120,330. These patents develop the process for forming heat welded foams, preparing the foam inside a mold. There are many patents related to the foaming process for structural alignments such as a core of sandwich panels by continuous direct extrusion, using a physical type foaming agent. However, many of them are limited to the machinery necessary for producing the foamed panel, forgetting the formulation of the material used.

In addition, panels based on polymeric plastic materials such as polyethylene (PE) or polypropylene (PP) have been developed in the state of the art. PP has several advantages with respect to PE, such as its mechanical properties, the bending elastic modulus being 1.5 GPa for PP, and 200 MPa for PE. However, PP foaming has always been hindered because of its low extensional viscosity and shear viscosity in a molten state (melt-strength). This limitation, associated to the chemical nature of PP, means that the latter does not have in normal conditions enough melt-strength to withstand the expansion of the gas bubbles during the foaming process, causing the collapse of the entire cellular structure and considerably limiting the production of foams with a reduced density (<200 kg/m$^3$). PP crosslinking processes by means of different chemical processes using catalysts were subsequently considered, providing the polymer with a higher melt-strength. However, in this case, due to the crosslinked structure of the polymer, even though light foams (<200 kg/m$^3$) are produced, the recyclability and recycling thereof is an extremely difficult process.

On other occasions, installations have been developed for the production of sandwich materials using flexible polyurethane or polyolefin-based flexible foamed cores (LDPE, EVA . . . ) attached to the skins by means of adhesives, applied in footwear, sports, etc. An example is patent EP 1 745 909 A2.

Patent DE 2041892 describes an installation for making non-recyclable shuttering boards which contemplates the possibility of using a polyurethane foam core attached to the skins by means of using adhesives.

However, there is still a need in the state of the art to provide a panel for construction formed exclusively of highly durable, easily reparable polymeric materials which can be recycled and even be used as raw material for forming new stiff recyclable panels for construction when their useful life has ended, thus closing a circle which protects the environment and allows huge savings in scarce natural materials.

In this sense the inventors of the present invention have developed a formulation and a production and assembly lime which allows producing stiff sandwich-type structural panels to be applied in construction, having optimal features as shuttering panels, emphasizing their high stiffness, reduced density and long durability, in addition to being completely recyclable due to the absence of adhesives.

OBJECT OF THE INVENTION

An object of the present invention is the installation for the production and assembly of stiff recyclable sandwich-type polymeric panels, in which the panel is formed by a foamed core, in which said foamed material offers good mechanical features for the proposed purpose, good nailability and reduced density.

The process for the production of the sandwich-type panel formed by a foamed core and two polymeric structural skins is also an object of the present invention.

The foamed core and the structural skins are also an object of the present invention.

And the actual stiff recyclable sandwich-type panel produced is also an object of the present invention.

DESCRIPTION OF THE INVENTION

The installation for the production of stiff recyclable sandwich-type panels is divided into three clearly defined lines:
Line A, in which the foamed core is produced.
Line B, in which the lamination and assembly of the structural skins occurs without the use of adhesives.
Line C, in which the structural skins are attached to the foamed core and the shape and dimensional finish of the sandwich-type panel occurs.
Line A is divided into four areas, specifically:
a) extrusion area for extruding the foamed core of the panel
b) calibration area for calibrating the foamed core
c) cooling area for cooling the foamed core
d) drawing area for drawing the foamed core.

The extruder is the essential element of the machine and the material is to be prepared therein for the following steps, such as the step of calibration, the step of cooling and the step of drawing to produce the foamed core.

The extruder that is used is formed by a single screw, enclosed in a linear chamber, inside which four basic functions such as the following are developed:
Transport of the fed material in partially solid/softened state
Melting of the fed material and compression thereof.
Gassing of the polymeric mixture with the gas.
Homogenization and metering of the mixture into the extrusion head, in which the mixture will be extruded, adopting the form of sheets with a variable density and thickness, forming the foamed core of the sandwich panel.

The foamed core is produced from a mixture of polymeric material comprising virgin or recycled linear homopolymer polypropylene (linear-PP), and high melt-strength branched polypropylene (bran-PP) and other additives, which can include lubricants to improve the processing of the material and nanometric and/or micrometric type reinforcement materials (variable length glass fibers), for the purpose of regulating the thermal and mechanical properties of the foamed core.

The foaming agent used is of the physical/chemical type. The physical foaming agent is introduced in the extruder and mixed with the molten mass in supercritical conditions, thus ensuring its maximum solubility. Developed technology allows regulating both the conditions of the pressure and of the gas input flow rate in the extruder, and the type of gases introduced ($CO_2$, $N_2$, n-butane, n-heptane or mixtures thereof).

The modification in the formulation of the percentages of linear-PP and bran-PP, as well as the incorporation of the additives and organophilic ceramic particles and mineral fillers, allows producing stiff recyclable panels with different features, in accordance with the needs of each case.

The materials involved in the process are previously mixed in pellet form, according to the suitable formulation to produce the suitable panel. This material thus mixed is introduced in a gravity feed hopper, referred to as a gravimetric type feed hopper, responsible for depositing the material in the feeding throat of the extruder, which throat is cooled to prevent the possible formation of plastic plugs which may be produced due to the sticking of the actual granules to one another or due to the sticking of the granules on the actual feed hopper or the feeding throat.

The feed of material is proportional to the rotation speed of the screw of the extruder, this extruder having a variable maximum production flow rate according to the type of material processed.

The design of the screw can be adapted according to the functions to be achieved by the extruder by means of changing the screw pitch, the variation of the diameter of the chamber or of the screw, etc. . . . . .

The screw is initially designed to cause the compression of the plastic material in the molten state, subsequently passing to a decompression or gassing area in which a gas is injected through nozzles under pressure, which joins the molten plastic material. Next, the screw has a third step through which, and once the plastic material is mixed with the gas introduced under pressure, the molten plastic and gas mass is again compressed, together with the homogenization and mixture of the product in a subsequent step, in which the non-expansion of the product inside the machine is ensured.

The maximum rotation speed of the screw is variable and will depend on the processed material, since if the material is reinforced with inorganic type fillers, the effort to be developed by the motor driving the screw may increase enormously, therefore enormously limiting the maximum rotation speed.

The electric resistances as well as the cooling fans of the different areas are connected to the different areas of the sleeve of the extruder, maintaining a stable temperature throughout the entire extruder.

After the screw there is a gear pump, followed by the extrusion head. The gear pump allows regulating the production, eliminating possible pressure fluctuations in the extrusion head.

The extrusion head has a planar geometry, suitable for the production of planar panels, with its inner part being designed to achieve good homogenization of the mixture of the molten polymer with the foaming agent, preventing the existence of decompression areas in the extruder before the mixture reaches the lips of the extrusion head, which is the area located exactly at the end of the head.

The decompressions are usually associated to increases of the section of the cylinder of the extruder or of the extrusion head, resulting in the complete or partial growth of the gas bubbles dispersed inside the molten polymer mass. This complete or partial foaming inside the machine normally causes the rupture and collapse of cells due to a drawing effect, since in these areas the mixture is at a higher temperature and normally does not have a melt-strength sufficient to withstand the growth of the bubbles and the drawing thereof.

The most relevant feature of the head proposed by the invention is that it has a T-shaped distributing channel adapted to the mentioned process of the invention, including distributing channels, sub-divided into others of a decreasing section, and further including a restricting bar and flexible opening lips. The extrusion head has coupled thereto different electric resistances ensuring the heating of the entire material traversing the head.

The designs of T-shaped distributing channels with a fishtail shape or even a helmet shape are not suitable for the material which is used, since they do not allow suitable control in the first steps of the expansion process. The main problem associated to the use of these types of designs is that the flow distribution in the three cases would involve a considerable decompression of the processed material, due to an increased section of the distributing channel with respect to that of the adapter attaching the extruder to the head. In the case of materials with dissolved gases, it would result in the complete or partial growth of the gas bubbles inside the head.

These conditions of complete or partial expansion of the material inside the head, together with the high temperatures, would result in a lower melt-strength with respect to the conditions verified at the outlet thereof in the lips, which strength is generally associated with the capacity of the material to withstand the overall cellular structure, since the deformation or even the rupture of the cells created could occur in the material drawing process.

In addition to not allowing suitable control of the entire foaming process, this situation could result in foamed sheets with an unsuitable cell morphology due to the coalescence of cells, associated to lower melt-strengths of the material, deformation and rupture of cells, and therefore in foams with high density (>400 kg/m$^3$) and limited properties, particularly in relation to the stiffness and tenacity of the foamed panel.

The head of the invention is the distributing multi-channel type due to a gradual reduction of the section of the material flow distributing channels at the outlet thereof through the extrusion lips, ensuring the gradual increase of the pressure of the molten material and thus allowing control of the first steps of the expansion or foaming process of the dissolved gas in the molten mass by decompression exactly at the outlet of the lips of the head.

The lips, together with the restricting bar located before them, are regulatable and allow controlling the pressure exerted on the molten mixture and, as such, regulating the density of the final sheet together with the amount of foaming agent.

Although the process for the cooling and final stabilization of the foamed sheet is essentially achieved by the action of the vacuum contact calibrators, this head design, novel as regards the material flow distribution, ensures that the molten polymeric mass with the dissolved gas or gases, previously homogenized by the action of the extruder, reaches the outlet thereof, i.e., the area of the lips, without having foamed.

The controlled foaming, achieved exactly at the outlet of the lips of the extrusion head ensures that the sheet has a uniform distribution of cell sizes, both in width and in thickness of the panel, as well as the suitable stabilization by the action of the contact calibrators of the cellular structure of the panel.

The calibration system serves to regulate not only the final expansion ratio of the foam, but also the surface appearance of the foamed panel. A final surface of the foamed panel which is not very rough is essential for the suitable assembly of the structural skins, either with or without the aid of an adhesive. The system consists of three, preferably four, aligned planar calibrators with the capacity to apply the vacuum, the first calibrator, together with the proportion of foaming agent used, being the one regulating the final thickness of the foamed panel or core, whereas the other two, preferably three, calibrators regulate the final surface appearance.

The panel is cooled by direct contact with cooled water in a bath.

The drawing and collection system of the foamed panel allows regulating the axial orientation of the panel and thus the mechanical properties in the two directions of the plane with regard to the foamed core production process.

The polymeric foamed core can have a density comprised between 100 and 500 kg/m$^3$, depending on the final density desired for the sandwich panel and a specific elastic modulus, i.e., relative to the density of the material, >1.2 GPa cm$^3$/g, preferably between 1.4 and 1.5 GPa cm$^3$/g, and a shear modulus comprised between 40 and 100 MPa.

The core must also have the following dimensions to be feed into the hot-melt system with the structural skins, i.e., a width comprised between 250 and 2400 mm, preferably between 1000 and 1400, a thickness comprised between 5 and 30 mm, and a variable length.

Once the foamed cores are produced, they are fed into assembly line C by hot-melting of the structural skins, which are in turn produced in line B, consisting of:

e) A lamination system by extrusion for continuous production of a polypropylene (PP)-based lamina with natural fibers, forming the surface coating.

f) A melting and calendering system to attach a PP-based structural lamina or layer reinforced with glass fiber to the lamina produced in e).

The structural skins are formed by a structural layer and a coating layer. The structural layer contacts with the core when the skins are attached thereto.

The preferably PP-based structural layer is reinforced with a glass fiber latticework, the percentage of glass fiber being between 30 and 60%, and preferably 60% of the weight. The thickness of this layer is 0.2-0.8 mm.

This latticework can have long fibers in the axial and transverse direction at a ratio of 1:1, 2:1, 3:1 and 4:1. Depending on the latticework, the elastic modulus may range between 13 GPa for the 1:1 type and 22 GPa for the 4:1 type.

The surface coating layer is formed by continuously extruded PP-based lamina with natural fibers, such as wood fiber, with a natural fiber content comprised between 30 and 50% by weight. These laminae have a thickness comprised between 0.8 and 1.8 mm, preferably 1.5 mm, and a width dependent on the final width sought for the sandwich panel.

In another possible embodiment, the coating layer is a co-extruded lamina formed in turn by two layers, one layer based on a mixture of polyolefins and organic fillers, such as cellulose fibers or particles, and a second polyolefin-based layer with organophilic ceramic particles and/or mineral fillers, preferably formed from carbonates or talc. Both the organic and mineral fillers form part of the respective mixtures in proportions comprised between 40 and 60% by weight.

The thickness of both layers is regulated according to the final features desired for the panel.

The structural skins thus formed have an overall elastic modulus of 8 to 15 GPa, depending on the type of latticework of the glass fibers present in the structural layer and of the percentage of natural fibers present in the coating layer.

In a simplified embodiment, the structural skins can be formed by a single PP-based extruded lamina reinforced with 50-55% by weight of short glass fiber, with an elastic modulus of 10-13 GPa.

The coating lamina or layer lamination system is formed by a co-rotating twin-screw extruder with a diameter of 140 mm producing a lamina with a PP-based composition with a percentage of natural fibers, typically wood fibers, comprised between 30 and 50% by weight. These laminae have a thickness comprised between 0.8 and 1.8 mm, preferably 1.5 mm, and a width between 250 and 2400 mm, depending on the final width sought for the sandwich panel.

This system consists of calendering means formed by three rollers, responsible for cooling the extruded lamina and establishing its final thickness. This system likewise consists of a feed mechanism for feeding the structural lamina or layer from reels for its lamination together with the extruded lamina. The structural layers are polymeric in nature reinforced with woven glass fibers.

The coated structural skins have an overall elastic modulus between 8 and 15 GPa, depending on the type of latticework of the fibers present in the surface coating layer.

The structural skins thus obtained are adhered by melting and pressure on both faces of the foamed core produced in line A.

The assembly of the structural skins to the core occurs in line C, consisting of:
   g) A system for feeding polymeric foamed cores.
   h) A system for feeding the structural skins which are to be assembled to the core.
   i) An attachment system for attaching the structural skins to the core by hot-melting.
   j) A traction system for collecting the continuously produced panels.
   k) A system for the longitudinal and transverse cutting of said panels.
   l) A palletizing system for palletizing the panels.

The system for feeding the lightweight polymeric cores produced in line A is a semi-automatic system which is responsible for feeding the mentioned cores, with dimensions comprised between 250 and 2400 mm wide, 1200 and 3500 mm long, and thicknesses comprised between 5 and 35 mm, usually cores 1200 mm wide, 2700 mm long and 15 mm thick, to the unit for attaching the mentioned cores to the structural skins, previously produced in line B.

The system for feeding the structural skins continuously feeds respective upper and lower skins on the core. These skins come from reels, being fed to the attachment system by an assembly of guide rollers and tension rollers.

The attachment system for attaching the coated structural skins to the core consists of a double infrared (IR) heating system, which acts simultaneously on both faces of the core and of the skins, as well as of a system of pressure rollers to consolidate the attachment.

It likewise consists of a calibration system with cooling by means of water, ensuring uniform thickness of the sandwich, and acting according to the final thickness sought. It furthermore has a cooling bath by means of a spraying with water.

The collection system consists of an assembly of traction rollers.

The system for cutting said panels consists of automatic circular saws, two of which act on the edges of the panel, cutting continuously to obtain the final width desired, and a third saw responsible for the transverse cutting of the sandwich panel to obtain it with the desired lengths.

The palletizing system consists of a system of clustering and packaging the sandwich panels produced for their subsequent distribution.

The process for producing stiff recyclable sandwich-type polymeric panels from the described installation consists of the following steps:
   a) In line A, producing the foamed cores according to the following steps:
      Contacting in an extruder the previously melted polymeric mass with the reinforcement materials and other additives, and homogenizing the mixture with the foaming agent;
      Obtaining the foamed core at the outlet of the extrusion head;
      Calibrating and cooling the foamed core;
      Drawing the foamed core;
   b) In another parallel line, line B, obtaining the structural skins in the following steps:
      Obtaining a polypropylene-based lamina reinforced with natural fibers, preferably wood fibers, by extrusion;
      Attaching a polypropylene-based structural lamina or layer preferably reinforced with glass fibers arranged in axial and transverse direction to the extruded lamina by calendering.
   c) In another line, line C, attaching the structural skins obtained in line B to the lightweight foamed cores obtained in line A, according to three steps:
      Feeding the foamed cores and the structural skins at a constant speed into an infrared (IR) heater system to cause the surface of the core and of the structural skins to melt;
      With the surfaces softened by the heat, attaching the skins to the core by means of the actuation of a series of pressure rollers causing the attachment of the skins to the core;
      Eliminating possible air bubbles that may have been left between the skins of the core by means of a contact calibrator with the capacity to apply the vacuum and with an internal cooling circuit, preferably by water.

BRIEF DESCRIPTION OF THE DRAWINGS

To complete the description which is being made and with the aim of aiding to better understand the features of the invention, a set of drawings is attached to the present specification as an integral part thereof, in which the following has been shown with an illustrative and non-limiting character.

DETAILED DESCRIPTION OF A PREFERRED EMBODIMENT

Figure 1:
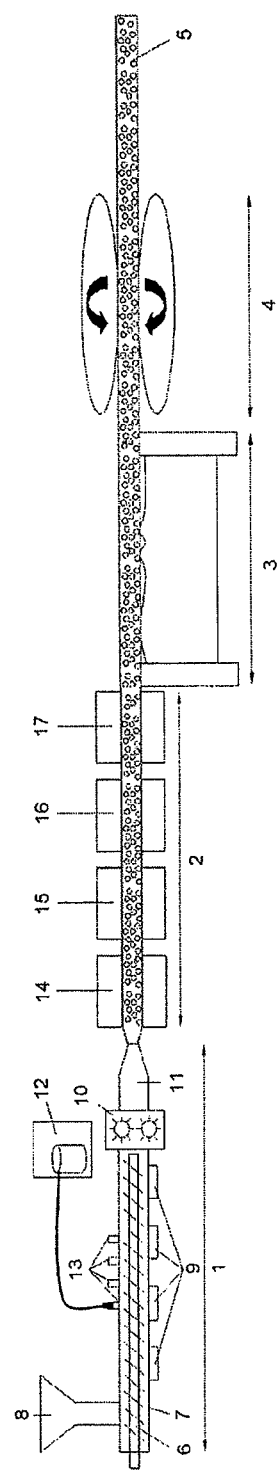
FIG. 1 depicts a diagram of production line A of the foamed core of the sandwich panel.

FIG. 1 depicts a diagram of the production line of the foamed core (5) of the sandwich panel, showing the four areas into which the machine is divided, which are:
   extrusion area (1)
   calibration area (2)
   cooling area (3)
   drawing area (4)

The extrusion area is formed by a single screw (6) enclosed in a linear chamber (7), inside which three basic functions are carried out, which are:

Transport of the fed material in partially solid or softened state

Melting of the fed material and compression thereof

Mixing, homogenization and metering into the shaping nozzle forming the planar extrusion head for the production of foamed sheets with variable thickness and density.

The material involved in the process is a polymeric material and it comprises a polymeric mass comprising a high melt-strength polymer and linear homopolymer polypropylene, being previously mixed in pellet form, according to the formulation suitable for producing the suitable panel. This material thus mixed is introduced in a gravity feed hopper (8), referred to as a gravimetric type feed hopper, responsible for depositing the material in the feeding throat of the extruder, which throat is cooled to prevent the possible formation of plastic plugs which may be produced due to the sticking of the actual granules to one another or due to the sticking of the granules on the actual feed hopper or the feeding throat.

The linear chamber (7) in which the screw (6) is located is heated by means of incorporating resistances (9) therethrough, so that the plastic material is initially softened and melted, and then so that the plastic material is melted throughout the chamber of the screw by maintaining this heating.

After the screw (6) and its linear chamber (7) there is a gear pump (10) and after this the extrusion head (11). This gear pump allows regulating the production, eliminating possible pressure fluctuations in the extrusion head (11).

The gases are introduced in the extruder from pressurized carboys (12), ensuring a supercritical fluid state and therefore the maximum solubility with the molten plastic mass. The machine preferably has four gas inlets (13) located at different points of the gassing area along the linear chamber (7), allowing regulating the level of mixing with the molten material mass.

The calibration area (2) serves to regulate not only the final expansion ratio of the foam, but also the surface appearance of the foamed panel. A final surface of the foamed panel which is not very rough is essential for the suitable assembly of the mentioned structural skins, either with or without the aid of an adhesive. The system consists of preferably four aligned planar calibrators (14) (15) (16) and (17) with the capacity to apply the vacuum, the first calibrator (14), i.e., the one closest to the extrusion head (11), together with the proportion of foaming agent used, being the one regulating the final thickness of the foamed panel, whereas the other three calibrators (15) (16) and (17) regulate the final surface appearance.

Next the panel passes to the cooling bath (3) in which it is cooled by direct contact with cooled water, next passing to the drawing and collection area of the panel (4), which allows regulating the axial orientation of the panel and thus the mechanical properties in the two directions of the plane with regard to the foamed core production process.

Figure 2:
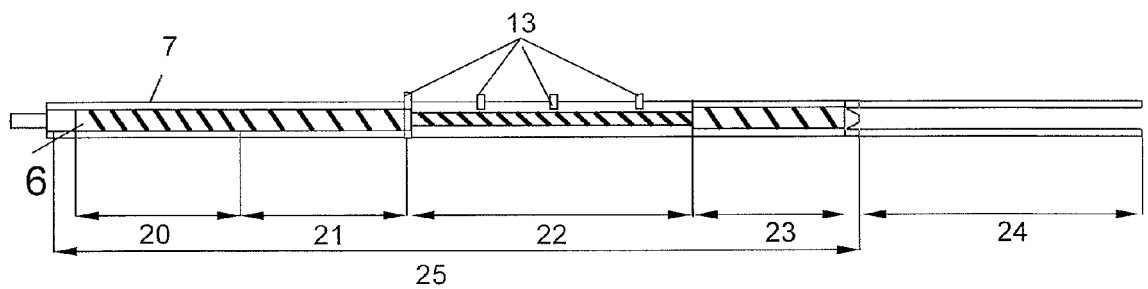
FIG. 2 depicts a diagram of the design of the screw and of the pumping and cooling area.

FIG. 2 depicts a diagram of the design of the screw and of the pumping and cooling area. This figure shows the screw (6) and the linear chamber (7) inside which the screw as well as the nozzles (13) for introducing the gas is located.

To provide a description of a practical embodiment of the screw, the measurements thereof will be given as a linear ratio of the length of the screw or of each of the areas with regard the diameter of the screw.

Therefore in a particular manner, the length of the screw depicted in (25) ranges between 36 and 42 times the diameter of the screw with a compression ratio comprised between 2 and 3 and with a pumping and cooling area (24), after the area of the screw, with measurements ranging between 10 and 14 times the diameter and which is in the area in which the mixture of polymer and gas is pumped and cooled, this area being necessary to eliminate by the effect of the gear pump (10) the possible pressure fluctuations generated in the head and to progressively cool the processed material mass.

Within the area (25) defined by the length of the screw (6) the chamber is divided into four areas which are:

feeding area (20)

compression area (21)

gassing area (22)

metering area (23)

The feeding area (20) is responsible for transporting the softened material coming from the feed hopper (8) and can have a length ranging approximately between 6 and 10 times the diameter of the screw.

The compression area (21), in which the material is melted, has a length between 6 and 10 times the diameter of the screw, in which one of the sections is double-threaded, depending on the processing speed.

The gassing area (22) is the area in which the different gas inlets (13) in the linear chamber (7) of the extruder are located. The length of this area also ranges between 10 and 14 times the diameter of the screw and has special mixing areas for mixing the molten material with the dispersed gas or gases, intercalated with material transport areas.

Finally, the metering area (23) is the area in which the molten material is mixed with the gas and it has a length between 4 and 8 times the diameter of the screw.

Figure 3:
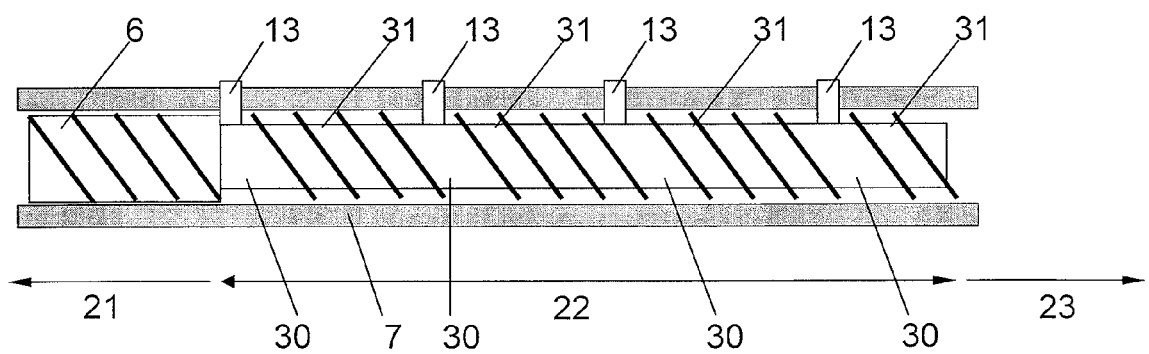
FIG. 3 depicts in detail the gassing area and the respective gas inlets.

FIG. 3 shows an enlarged detail of the gassing area (22) and how the previously mentioned compression area (21) and mixing area (23) are located at its sides. This figure highlights, in addition to the nozzles (13) for introducing the gas, how the screw (6) adopts several qualities, particularly that of having a shaft with a smaller diameter, whereby creating a larger space with respect to the linear chamber (7), facilitating the mixing of the gas with the plastic substance, in which the gas is inserted; and secondly how there are special mixing areas (30) for mixing the molten material with the dispersed gas or gases, intercalated with material transport areas (31).

Figure 4:
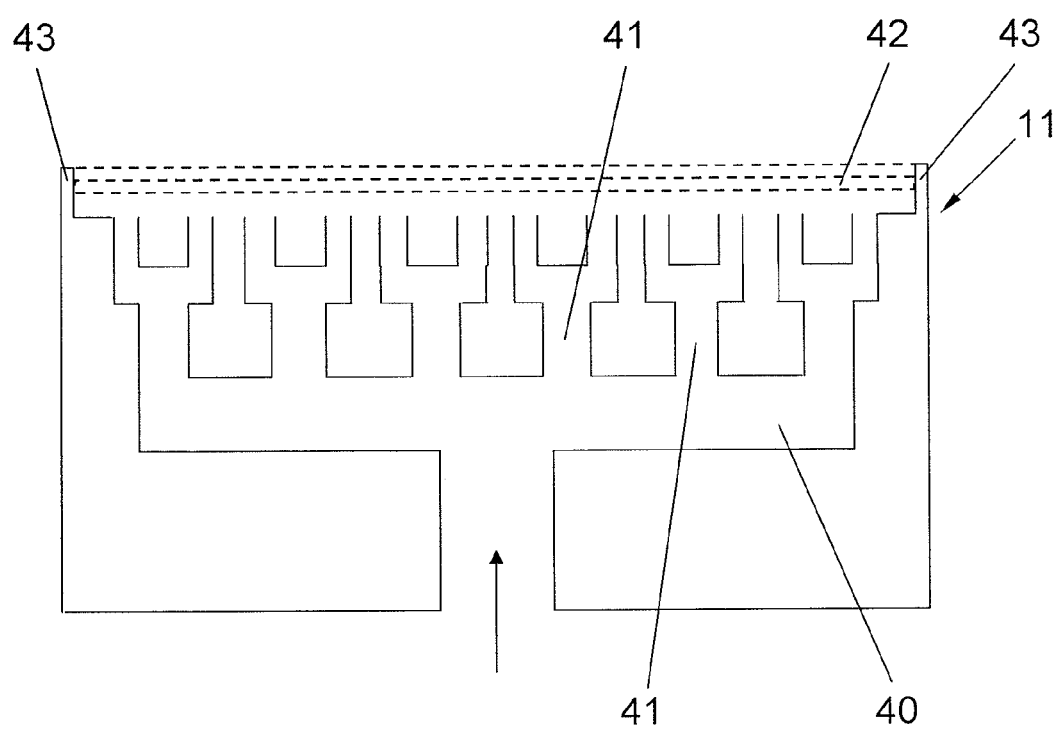
FIG. 4 depicts a diagram of the multi-channel extrusion head used in the production of the foamed panels of the invention.

FIG. 4 depicts a diagram of the multi-channel extrusion head (11) used in the production of the foamed cores of the invention. The most relevant feature of the head proposed by the invention is that it has a T-shaped distributing channel (40) adapted to the mentioned process of the invention, which includes distributing channels sub-divided in other channels (41) with a decreasing section, and further including a restricting bar (42) and flexible opening lips (43). The extrusion head (11) has coupled thereto different electric resistances ensuring the heating of the entire material traversing it.

The head of the invention is of the distributing multichannel due to a gradual reduction of the section of the material flow distributing channels at the outlet thereof through the extrusion lips (43), ensuring the gradual increase of the pressure of the molten material and thus allowing control of the first steps of the expansion or foaming process of the dissolved gas in the molten mass by decompression exactly at the outlet of the lips of the head.

The lips, together with the restricting bar (42) located before them, are regulatable and allow controlling the pressure exerted on the molten mixture and, as such, regulating the density of the final sheet together with the amount of foaming agent.

Although the process for the cooling and final stabilization of the foamed sheet is essentially achieved by the action of the vacuum contact calibrators, this head design, novel as regards the material flow distribution, ensures that the molten polymeric mass with the dissolved gas or gases, previously homogenized by the action of the extruder, reaches the outlet thereof, i.e., the area of the lips, without having foamed.

The controlled foaming, achieved exactly at the outlet of the lips (43) of the extrusion head ensures that the sheet has a uniform distribution of cell sizes, both in width and in thickness of the panel, as well as the suitable stabilization by the action of the contact calibrators of the cellular structure of the panel.

Line C is fed with the foamed sheets produced in line A. The structural skins which will be adhered to the foamed core are produced parallelly in line B.

Figure 5:
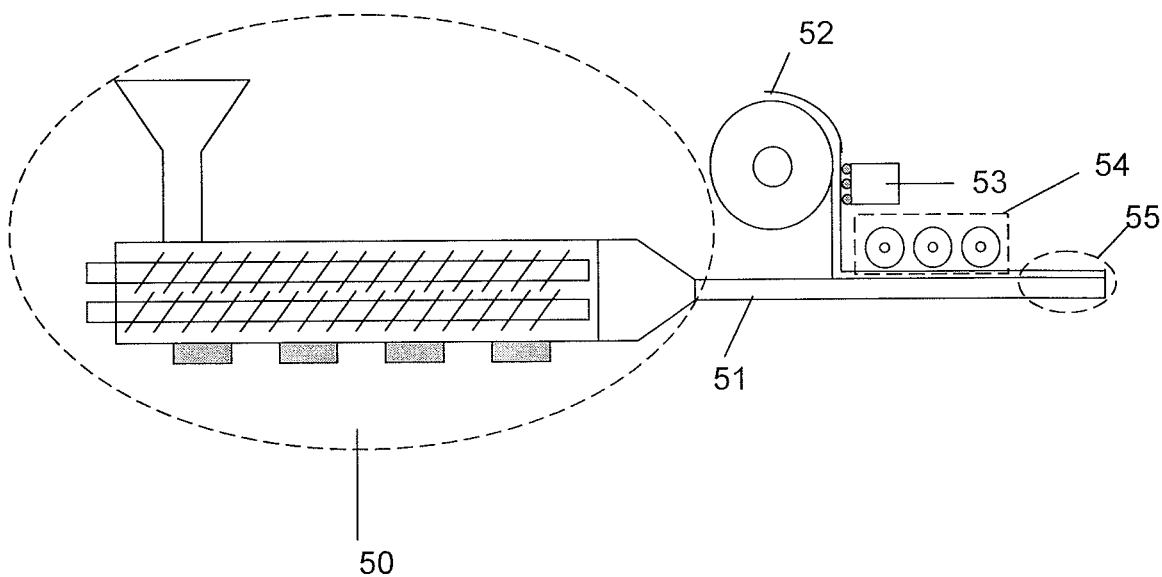
FIG. 5 depicts line B of the installation, in which the structural skins are produced.

FIG. 5, which shows line B, shows the production system of the structural skins which will subsequently be attached without adhesives to both sides of the core in the attachment system to produce the definitive sandwich panel. Firstly, it consists of a twin-screw extruder (50), with a diameter of 140 mm and a length of 5000 mm, in which there is continuously produced by extrusion a PP-based lamina reinforced with natural fibers (51), particularly wood fibers, in percentages of fiber by weight between 30 and 50%. This lamina has typical thicknesses of 0.8-1.8 mm, particularly 1.5 mm, and a width of 250-2400 mm. Secondly, the structural layer (52), a PP-based lamina reinforced with glass fiber (30-60% of glass fiber), preferably glass fiber with different latticeworks, with a thickness of 0.2-0.8 mm, is fed into the system through a reel. This structural layer (52) passes through an IR system (53), which locally melts the polymeric matrix, aiding, together with the calendering system (54) formed by three rollers, in attaching the coating lamina (52) to the surface of the still softened PP-based lamina reinforced with natural fibers (51) produced in the extruder (50). This system of three rollers is furthermore responsible for cooling the extruded lamina with the coating and establishing the final thickness of the coated lamina.

The structural skins (55) thus produced consist of a coating layer of about 0.8-1.8 mm thick of a PP-based lamina reinforced with 30-50% by weight of natural fibers (51) and a structural layer of about 0.2-0.8 mm of a PP-based lamina reinforced with 30-60% of fibers (52), particularly glass fibers.

Particularly the structural layer (52) can have different latticeworks in relation to the directionality of panel. It may thus have 1:1, 2:1, 3:1 and 4:1 latticeworks, being the ratio between the number of fibers oriented in one direction and in another direction (therefore, the 1:1 latticework will have one transversely oriented fiber for each fiber oriented in the axial direction), the elastic modulus ranging between 13 GPa for the 1:1 latticework and 22 GPa for the 4:1 latticework.

In another possible embodiment, the coating layer is a co-extruded lamina formed in turn by two layers, one layer based on a mixture of polyolefins and organic fillers, preferably of a cellulose nature, and a second polyolefin-based layer with mineral fillers.

Figure 6:
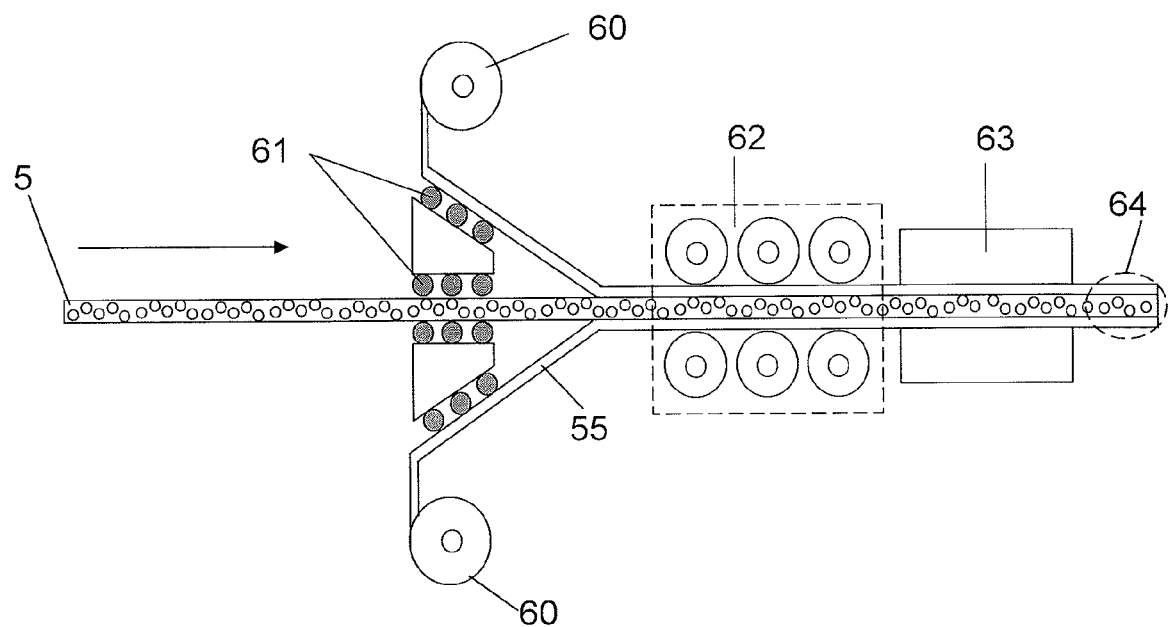
FIG. 6 depicts line C of the installation, in which the structural skins are physically attached to the foamed core and the panels are longitudinally and transversely cut to adjust them to the required dimensions.
Figure 7:
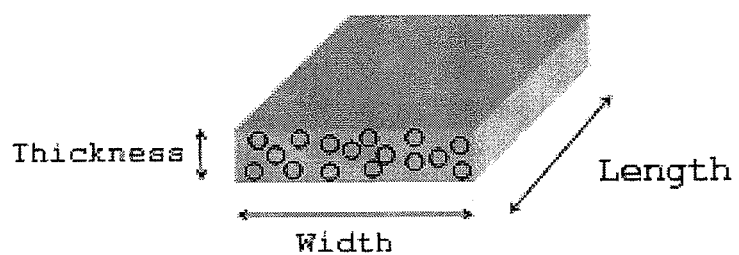
FIG. 7 shows a detail in perspective of the foamed core produced in line A.
Figure 8:
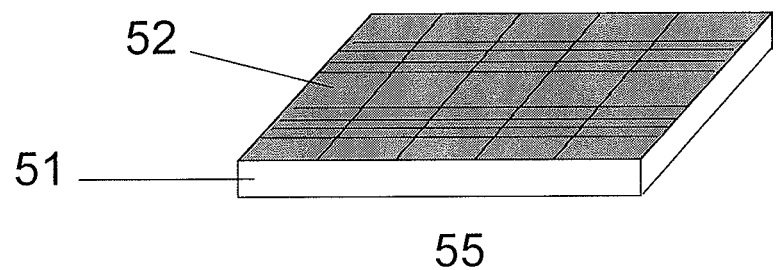
FIG. 8 depicts a detail of a structural skin produced in line B, in which the axial and transverse arrangement of the glass fiber can be seen.

FIG. 6 shows the line of attachment by hot-melting the already coated structural skins to the lightweight polymeric core. This line is fed either discontinuously (from stored lightweight polymeric cores) or continuously, with the PP-based foamed sheets produced by a physical foaming process by extrusion. The structural skins (55) coming from two reels (60) are likewise introduced in the system such that the skins are superimposed on the two faces of the foamed core (5), the placement of respective skins on both sides of the lightweight polymeric foamed core (5) being possible.

As the coated structural skins are brought closer to both sides of the lightweight core, they pass through an infrared (IR) system (61) which acts by locally melting the polymer, acting simultaneously on the surface of the core and therefore, together with the immediate actuation of the pressure rollers (62) aligned on both sides of the core (three on each side), allowing a good attachment between the core and both structural skins. A subsequent planar contact calibrator (63) with the capacity to apply the vacuum and with an internal cooling circuit with water allows eliminating possible air bubbles that may have been trapped in the welding of the skins and core and ends up forming the final thickness thereof.

Figure 9:
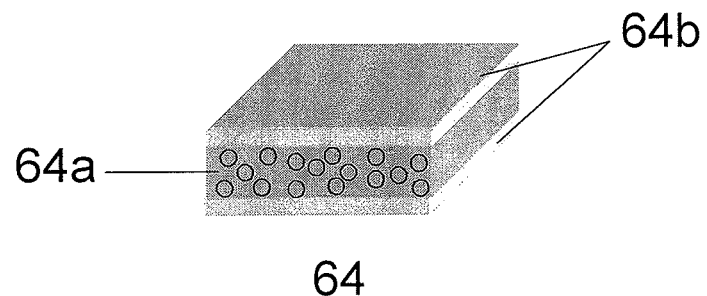
FIG. 9 shows a detail in perspective of the sandwich panel produced in line C.

FIG. 9 shows the sandwich (64) produced in line C, which must have a core thickness (64a) comprised between 7 and 40 mm and skins (64b) with a thickness of 1.2-2.2 mm. The overall density will be comprised between 400-700 kg/m$^3$ and the elastic modulus between 5-10 GPa.

The invention claimed is:

1. A process for the continuous production of a stiff polymeric foamed sheet, comprising the following steps:
   a) contacting a polymeric mass and other components of a mixture in an extruder of a first assembly line;
   b) producing a foamed sheet (5) by extrusion, such that foaming begins at an outlet of an extrusion head, wherein the extrusion head is a multi-channel head and includes a T-shaped material distributing channel, a plurality of distributing channels downstream from the T-shaped material distributing channel, the plurality of distributing channels having a smaller cross section than the T-shaped material distributing channel, and wherein the plurality of distributing channels are connected to additional multiple channels having cross-sections that are smaller than cross-sections of the plurality of distributing channels, and wherein the outlet includes a restricting bar and flexible opening lips, so as to gradually increase pressure on the mixture until the mixture reaches the lips of the outlet;
   c) calibrating the foamed sheet;
   d) cooling and drawing the foamed sheet so as to form a foamed core;
   e) producing structural skins in a second assembly line separate from the first assembly line;
   f) feeding the foamed core (5) and the structural skins (55) into a third assembly line;
   g) attaching the structural skins (55) to the foamed core (5) by heat and pressure to form sandwich panels in the third assembly line; and
   h) longitudinally and transversely cutting the sandwich panels to predetermined dimensions.

2. The process according to claim 1, wherein each of the sandwich panels comprises:
   a stiff polymeric-ceramic hybrid foamed core, containing polypropylene and organophilic ceramic particles and mineral fillers, with a thickness between 5 and 35 mm, a specific elastic modulus between 1.4 and 1.5 GPa cm3/g and a shear modulus between 40 and 100 MPa, and two structural skins each of which is formed by two layers, a polymeric, polypropylene-based, structural layer reinforced with glass fibers, and a polypropylene-based surface coating layer reinforced with natural fibers,
   the process further comprising attaching the two structural skins to the foamed core by hot-melting with pressure without adhesives.

3. The process according to claim 2, wherein the structural layer is an extruded lamina containing 30-60% by weight of glass fibers, and wherein the thickness of the structural layer is 0.2 to 0.8 mm.

4. The process according to claim 3, wherein long glass fibers of the structural layer are arranged axially and transversely in an axial fiber to transverse fiber ratio of one of 1:1, 1:2, 1:3 and 1:4.

5. The process according to claim 4, wherein the structural layer of the skin has an elastic modulus range of 13-22 GPa, depending on the axial fiber to transverse fiber ratio of the glass fibers.

6. The process according to claim 4, wherein the two structural skins, formed by the structural layer and the surface coating layer, has an overall elastic modulus of 8 to 15 GPa, depending on the axial fiber to transverse fiber of the glass fibers in the structural layer and on a percentage of natural fibers in the surface coating layer.

7. The process according to claim 2, wherein the surface coating layer is an extruded polypropylene-based lamina with wood fibers or other natural fibers, with a fiber content of 30 to 50% by weight and a thickness of 0.8 to 1.8 mm.

8. The process according to claim 2, wherein the two structural skins are formed by a previously extruded single polypropylene-based lamina with short glass fiber, with a percentage of 50-55% by weight of fiber and with an elastic modulus of 10-13 GPa.

9. The process according to claim 2, wherein the sandwich panel has a thickness of between 7 and 40 mm, the two structural skins have a thickness of 1.2 to 2.2 mm, and the sandwich panel has an overall density of 400-700 kg/m3 and an elastic modulus of 5 to 10 GPa.

\* \* \* \* \*